US012793693B2

(12) United States Patent
Shidoji

(10) Patent No.: US 12,793,693 B2

(45) Date of Patent: Nov. 10, 2026

(54) SOUND PROCESSING METHOD, SOUND PROCESSING APPARATUS, AND NON-TRANSITORY COMPUTER-READABLE STORAGE MEDIUM STORING PROGRAM

(71) Applicant: Yamaha Corporation, Hamamatsu (JP)

(72) Inventor: Hiroomi Shidoji, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 195 days.

(21) Appl. No.: 18/679,680

(22) Filed: May 31, 2024

(65) Prior Publication Data

US 2024/0404502 A1 Dec. 5, 2024

(30) Foreign Application Priority Data

Jun. 2, 2023 (JP) ................................ 2023-091289

(51) Int. Cl.
*G10K 15/08* (2006.01)

(52) U.S. Cl.
CPC .................................... *G10K 15/08* (2013.01)

(58) Field of Classification Search
CPC ...................................................... G10K 15/08
See application file for complete search history.

(56) References Cited

U.S. PATENT DOCUMENTS

| | | | | |
|---|---|---|---|---|
| 11,749,252 | B2 * | 9/2023 | Tsuji | H04S 7/30<br>381/63 |
| 11,805,383 | B2 * | 10/2023 | Honma | H04S 3/008 |
| 12,526,601 | B2 * | 1/2026 | Lee | H04S 7/307 |
| 2008/0019535 | A1 * | 1/2008 | Mitsuhashi | H04S 7/305<br>381/66 |
| 2011/0261966 | A1 * | 10/2011 | Engdegard | G10L 19/008<br>381/1 |
| 2014/0355765 | A1 * | 12/2014 | Kulavik | H04S 3/006<br>381/17 |
| 2016/0125871 | A1 * | 5/2016 | Shirakihara | H04S 7/305<br>381/63 |
| 2017/0078821 | A1 * | 3/2017 | Faller | H04S 7/306 |
| 2017/0208415 | A1 * | 7/2017 | Ojala | H04S 7/00 |
| 2018/0206026 | A1 * | 7/2018 | Notzel | H04R 1/025 |
| 2020/0053500 | A1 * | 2/2020 | Tran | H04S 7/303 |
| 2021/0289310 | A1 * | 9/2021 | Herre | H04S 7/303 |
| 2022/0021997 | A1 * | 1/2022 | Morales | G06N 3/04 |
| 2023/0007423 | A1 * | 1/2023 | Hatanaka | H04S 7/303 |
| 2023/0209266 | A1 * | 6/2023 | Miyoshi | H03F 3/68<br>381/303 |
| 2023/0217204 | A1 * | 7/2023 | Boothe | H04S 7/303<br>381/301 |

FOREIGN PATENT DOCUMENTS

JP 2000-69598 A 3/2000

* cited by examiner

*Primary Examiner* — Oyesola C Ojo

(74) *Attorney, Agent, or Firm* — Crowell & Moring LLP

(57) ABSTRACT

A sound processing method includes receiving an audio signal, generating an effect signal obtained by performing reverb processing on the audio signal, selecting a first speaker among three or more speakers, and selecting a second speaker corresponding to the first speaker based on a positional relationship with the first speaker, and distributing the effect signal to the selected first speaker and second speaker.

20 Claims, 9 Drawing Sheets

SOUND PROCESSING METHOD, SOUND PROCESSING APPARATUS, AND NON-TRANSITORY COMPUTER-READABLE STORAGE MEDIUM STORING PROGRAM

CROSS-REFERENCE TO RELATED APPLICATION

This Nonprovisional application claims priority under 35 U.S.C. § 119 (a) to Japanese Patent Application No. 2023-091289, filed in Japan on Jun. 2, 2023, the entire contents of which is hereby incorporated by reference.

TECHNICAL FIELD

An embodiment of the present disclosure relates to a sound processing method, a sound processing apparatus, and a program.

BACKGROUND

Japanese Unexamined Patent Application Publication No. 2000-69598 discloses a multi-channel surround reproduction apparatus that uses an all-pass filter to attain the non-correlation of a reverberation sound for multi-channel surround reproduction. Accordingly, the multi-channel surround reproduction apparatus disclosed in Japanese Unexamined Patent Application Publication No. 2000-69598 increases a reverb effect.

The multi-channel surround reproduction apparatus disclosed in Japanese Unexamined Patent Application Publication No. 2000-69598 does not recognize a problem in a case of distributing an effect signal to three or more speakers. For example, when an audio signal of a certain channel is always outputted to the same two speakers, a desired reverb effect may be unable to be obtained at a position far from the two speakers even when the reverb effect is able to be obtained at a position near the two speakers.

SUMMARY

An embodiment of the present disclosure is directed to provide a sound processing method that increases a reverb effect in a case in which an effect signal is distributed to three or more speakers.

A sound processing method according to an embodiment of the present disclosure includes receiving an audio signal, generating an effect signal obtained by performing reverb processing on the audio signal, selecting a first speaker among three or more speakers, and selecting a second speaker corresponding to the first speaker based on a positional relationship with the first speaker, and distributing the effect signal to the selected first speaker and second speaker.

According to an embodiment of the present disclosure, a reverb effect is able to be increased in a case in which an effect signal is distributed to three or more speakers.

DETAILED DESCRIPTION

Figure 1:
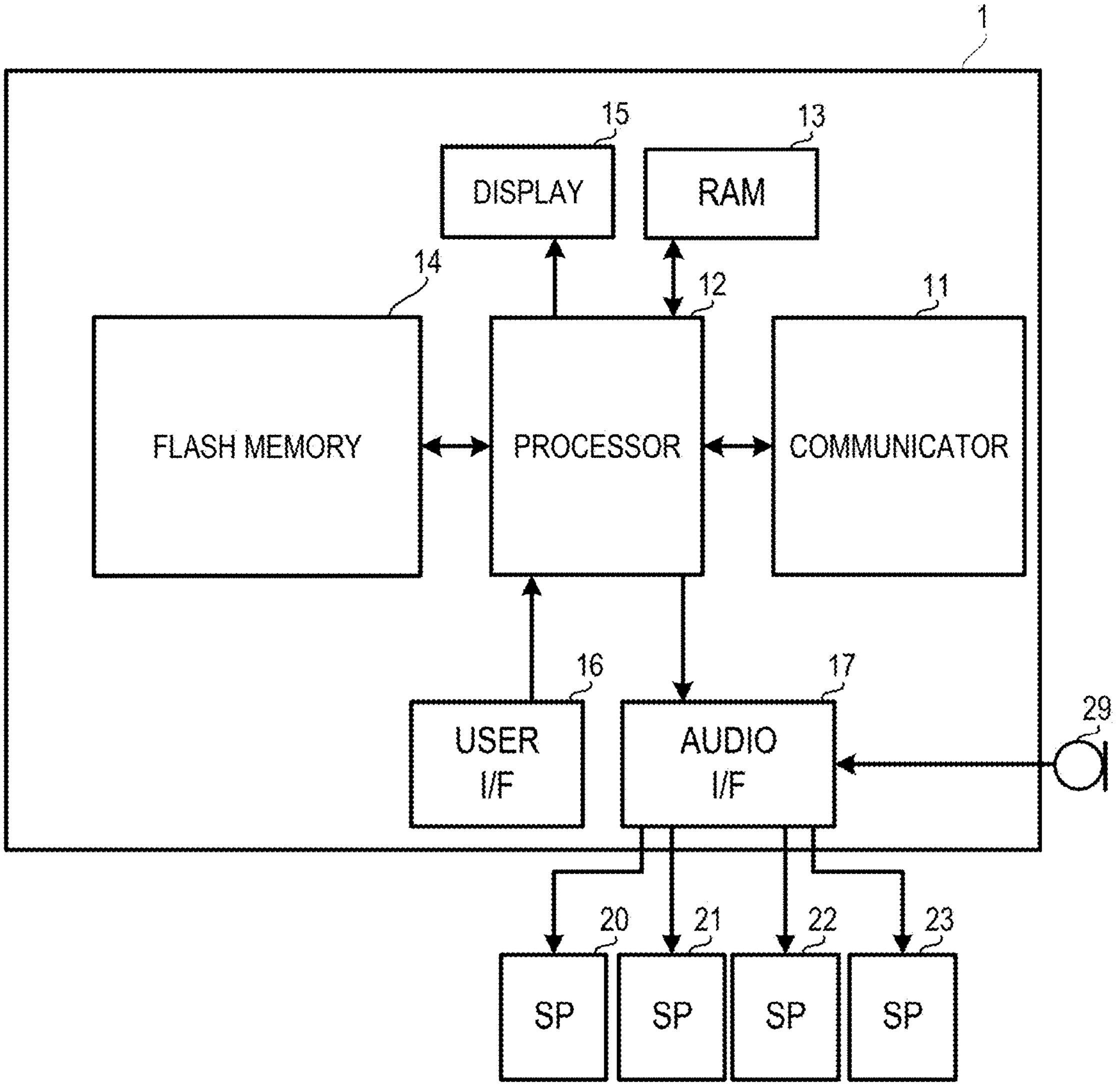
FIG. 1 is a block diagram showing a configuration of a sound processing apparatus 1.

FIG. 1 is a block diagram showing a configuration of a sound processing apparatus 1. The sound processing apparatus 1 includes a communicator 11, a processor 12, a RAM 13, a flash memory 14, a display 15, a user interface (I/F) 16, and an audio I/F 17.

The sound processing apparatus 1 includes an information processing apparatus such as a personal computer, a smartphone, a tablet computer, or the like, for example.

The communicator 11 communicates with another apparatus such as a server. The communicator 11 has a wireless communication function such as Bluetooth (registered trademark) or Wi-Fi (registered trademark), for example, and a wired communication function such as a USB or a LAN.

The display 15 includes an LCD, an OLED, or the like. The display 15 displays a video that the processor 12 outputs.

The user I/F 16 is an example of an operator. The user I/F 16 includes a mouse, a keyboard, a touch panel, or the like. The user I/F 16 receives an operation from a user. It is to be noted that the touch panel may be stacked on the display 15.

The audio I/F 17 has an analogue audio terminal, a digital audio terminal, or the like, and connects acoustic devices. In the present embodiment, the audio I/F 17 connects a plurality of speakers including a speaker 20, a speaker 21, a speaker 22, and a speaker 23 as an example of an acoustic device, and outputs an audio signal to the speakers. The audio I/F 17 connects a plurality of microphones 29 as an example of an acoustic device and receives an audio signal from the microphone 29.

The processor 12 includes a CPU, a DSP, a SoC (System on a Chip), or the like. The processor 12 reads a program from the flash memory 14 being a storage medium, temporarily stores the program in the RAM 13, and performs various operations. It is to be noted that the program does not need to be stored in the flash memory 14. The processor 12, for example, may download the program from another apparatus such as a server and may temporarily store the program in the RAM 13, when necessary.

Figure 2:
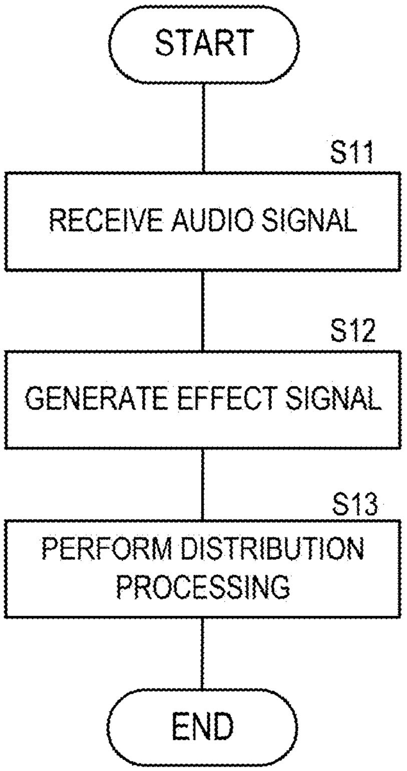
FIG. 2 is a flowchart showing an operation of a processor 12.

FIG. 2 is a flowchart showing an operation of a processor 12. The processor 12 receives an audio signal through the audio I/F 17 (S11). The processor 12 generates an effect signal obtained by performing reverb processing on the received audio signal (S12). The processor 12 distributes the effect signal to the plurality of speakers including the speaker 20, the speaker 21, the speaker 22, and the speaker 23 (S13).

Figure 3:
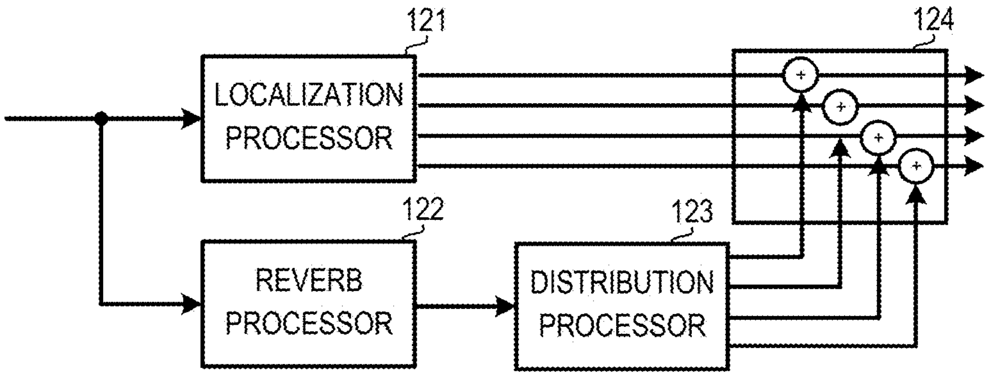
FIG. 3 is a block diagram showing a functional configuration of the processor 12.

FIG. 3 is a block diagram showing a functional configuration of the processor 12. The processor 12 functionally has a localization processor 121, a reverb processor 122, a distribution processor 123, and an adder 124.

The localization processor 121 and the reverb processor 122 receive an audio signal through the audio I/F 17. The localization processor 121 distributes the audio signal to each of the speaker 20, the speaker 21, the speaker 22, and the speaker 23 at a predetermined level ratio, based on information showing a position at which a direct sound is localized and positions of the speaker 20, the speaker 21, the speaker 22, and the speaker 23. When the same audio signals are outputted to two speakers at the same level, an acoustic image is localized at the center of a line segment connecting the two speakers. When the same audio signals are outputted to two speakers at different levels, an acoustic image is localized near the position of a speaker with the higher level of the line segment connecting the two speakers. Therefore, the localization processor 121 localizes a component of a direct sound by performing level adjustment of an audio signal to be outputted with a speaker of an output destination, based on the information showing a position at which a direct sound is localized and the positions of the speaker 20, the speaker 21, the speaker 22, and the speaker 23.

It is to be noted that the information showing the position of a speaker is indicated by two-dimensional or three-dimensional coordinates with an origin located at a certain position in a certain acoustic space. The acoustic space includes information showing a shape of a three-dimensional space corresponding to a venue such as a church, a live music club, or a concert hall, for example. The information showing the acoustic space may be coordinate information based on 3D CAD data of a real venue or may be logical coordinate information on a certain unreal venue (information normalized by 0 to 1).

The reverb processor 122 performs reverb processing on an audio signal. The reverb processing is processing to enhance a reverberant sound by generating a plurality of effect signals (pseudo reflected sounds) of which the levels are adjusted by adding a predetermined amount of delay to the sound signal, for example. In particular, the sound processing apparatus 1 according to the present embodiment implements more complex and spread reverberation than the ordinary reverb processing by sequentially outputting the plurality of effect signals from the speaker 20, the speaker 21, the speaker 22, and the speaker 23.

The sound processing apparatus 1 according to the present embodiment sequentially outputs the plurality of effect signals to three or more speakers. Hypothetically, when the plurality of effect signals are outputted to two speakers (a first speaker and a second speaker), a first effect signal may be outputted to the first speaker, and then a next second effect signal may be outputted to the second speaker. However, when the plurality of effect signals are sequentially outputted to three or more speakers, the problem is which speaker an effect signal is distributed to. For example, when a certain effect signal is always outputted to the same two speakers, a desired reverb effect may be unable to be obtained at a position far from the two speakers even when the reverb effect is able to be obtained at a position near the two speakers.

Then, in the present embodiment, the distribution processor 123 selects the first speaker among the three or more speakers, selects the second speaker corresponding to the first speaker based on a positional relationship with the first speaker, and distributes the effect signal to the selected first speaker and second speaker.

Figure 4:
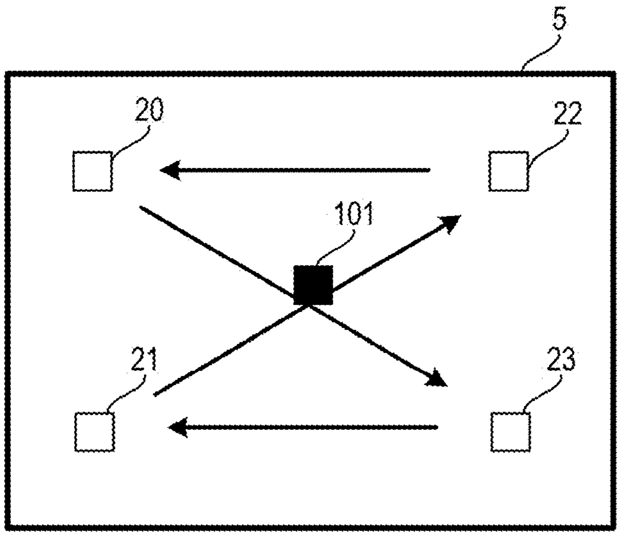
FIG. 4 is a plan view showing in a simulated manner an installation mode of a plurality of speakers including a speaker 20, a speaker 21, a speaker 22, and a speaker 23 that are installed in a certain room 5.

FIG. 4 is a plan view showing in a simulated manner an installation mode of the plurality of speakers including the speaker 20, the speaker 21, the speaker 22, and the speaker 23 that are installed in a certain room 5. The speaker 20 is placed at the left front of a listening position 101, the speaker 21 is placed at the left rear of the listening position 101, the speaker 22 is placed at the right front of the listening position 101, and the speaker 23 is placed at the right rear of the listening position 101.

The distribution processor 123 distributes the effect signal, based on a distance of the speaker 20, the speaker 21, the speaker 22, and the speaker 23. The distribution processor 123 selects the farthest speaker from the first speaker as the second speaker, for example. However, the distribution processor 123 does not next select the previously selected speaker.

The distribution processor 123, in a case of selecting the speaker 20 as the first speaker, selects the speaker 23 farthest from the speaker 20 being the first speaker, as the second speaker. Then, the distribution processor 123 outputs the first effect signal to the selected speaker 20, and outputs the second effect signal to the next selected speaker 23. Furthermore, the distribution processor 123 selects the speaker 21 as a speaker corresponding to the speaker 23. Although the speaker farthest from the speaker 23 is the speaker 20, the speaker 20 is selected before the speaker 23 is selected. Therefore, the distribution processor 123 selects the next farther speaker 21. Next, the distribution processor 123 selects the speaker 22 as a speaker corresponding to the speaker 21. Next, the distribution processor 123 selects the speaker 20 as a speaker corresponding to the speaker 22.

In such a manner, the distribution processor 123 sequentially outputs the effect signal, based on the positions of the speaker 20, the speaker 21, the speaker 22, and the speaker 23.

Accordingly, the sound processing apparatus 1, when distributing an effect signal to three or more speakers, distributes the effect signal to all the speakers with no waste. Therefore, a user can gain a new customer experience of being able to feel a high reverb effect (an effect so as to be wrapped from all sides) by all the installed speakers.

First Modification

Figure 5:
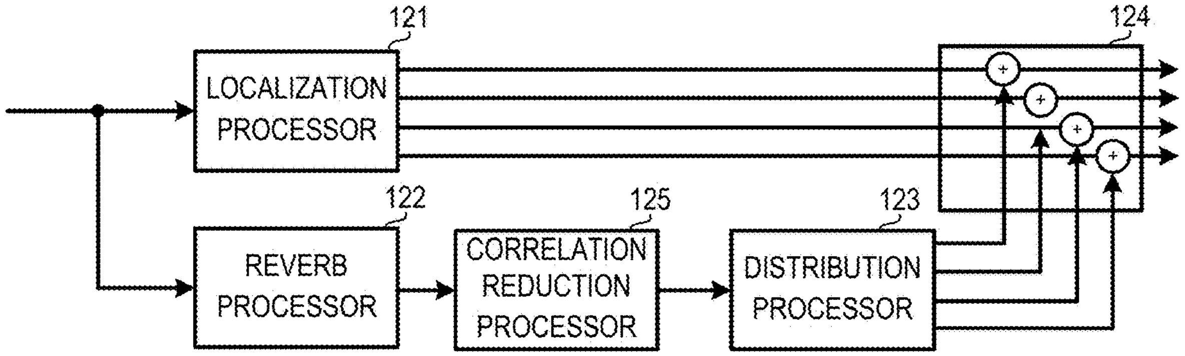
FIG. 5 is a block diagram showing a functional configuration of the processor 12 according to a first modification.

FIG. 5 is a block diagram showing a functional configuration of a processor 12 according to a first modification. The same reference numerals are given to the same configurations in FIG. 3, and the description will be omitted.

The processor 12 according to the first modification has correlation reduction processor 125. The correlation reduction processor 125 performs correlation reduction processing on the effect signal outputted from the reverb processor 122. The correlation reduction processing is phase adjustment by an all-pass filter, for example. The all-pass filter is a filter that changes phase characteristics without changing amplitude characteristics. The correlation reduction processor 125 reduces correlation of the first effect signal and the second effect signal by the all-pass filter. When the same audio signals are outputted to two speakers, an acoustic image is localized at a position with the same phase on the line segment connecting the two speakers. The correlation reduction processor 125 by reducing the correlation, reduces the sense of localization of the effect signal.

As a result, the user can gain a new customer experience of being able to feel the further higher reverb effect.

Second Modification

A correlation reduction processor 125 of a second modification includes a finite impulse response (FIR) filter. The correlation reduction processor 125 performs processing that convolves a certain impulse response with an input signal. The impulse response corresponds to a filter that does not change the amplitude characteristics and changes only the phase characteristics. The impulse response uses only a phase component of white noise for a given time length (1000 samples when a sampling frequency is 48 kHz, for example). Phase-matched frequencies, although certainly existing in the all-path filter of the first modification, do not exist in white noise. Therefore, the correlation reduction processor 125 is able to significantly reduce the correlation by convolving such an impulse response with an input signal.

As a result, the user can gain a new customer experience of being able to feel the further higher reverb effect.

Third Modification

Figure 6:
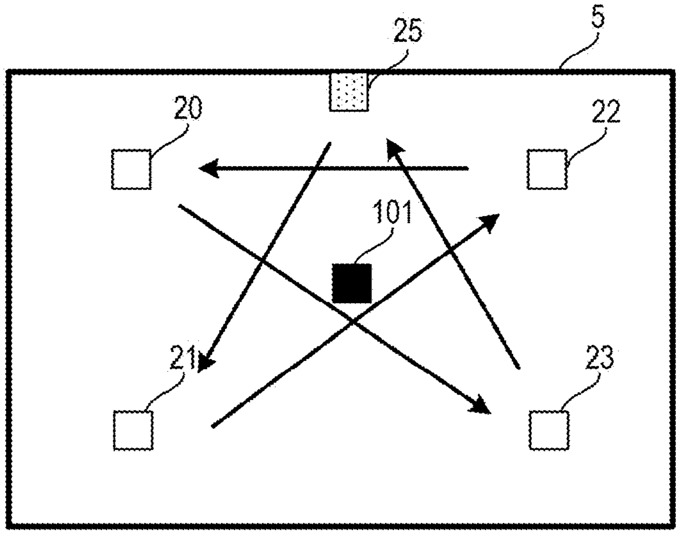
FIG. 6 is a plan view showing in a simulated manner an installation mode of a plurality of speakers including a speaker 20, a speaker 21, a speaker 22, and a speaker 23 that are installed in a certain room 5 according to a third modification.

In a third modification, at least one of the first speaker or the second speaker includes a virtual speaker virtually localized by acoustic image localization processing. FIG. 6 is a plan view showing in a simulated manner an installation mode of a plurality of speakers including a speaker 20, a speaker 21, a speaker 22, and a speaker 23 that are installed in a certain room 5 according to the third modification. The same reference numerals are given to the same configurations in FIG. 4, and the description will be omitted.

A sound processing apparatus 1 according to the third modification outputs an effect signal to the speaker 20, the speaker 21, the speaker 22, the speaker 23, and a virtual speaker 25. The virtual speaker 25 is a speaker generated by virtually performing acoustic image localization when the same audio signal is outputted to the speaker 20 and the speaker 21 at the same timing and the same volume.

The distribution processor 123 sequentially outputs the effect signal, based on a position of the speaker 20, the speaker 21, the speaker 22, the speaker 23, and the virtual speaker 25. For example, the distribution processor 123, in a case of selecting the speaker 20 as the first speaker, selects the speaker 23 farthest from the speaker 20 being the first speaker, as the second speaker. Then, the distribution processor 123 outputs a first effect signal to the selected speaker 20, and outputs a second effect signal to the next selected speaker 23. Furthermore, the distribution processor 123 selects the farthest virtual speaker 25 as a speaker corresponding to the speaker 23. Next, the distribution processor 123 selects the speaker 21 as a speaker corresponding to the virtual speaker 25. Next, the distribution processor 123 selects the speaker 22 as a speaker corresponding to the speaker 21. Next, the distribution processor 123 selects the speaker 20 as a speaker corresponding to the speaker 22.

In such a manner, the sound processing apparatus 1 sequentially outputs the effect signal to a further large number of speakers including the virtual speaker 25.

According to the third modification, for example, since a virtual speaker is also able to be placed at a position to which a speaker is unable to be attached due to interior equipment or the like, the user can gain a new customer experience of feeling a desired reverb effect.

Fourth Modification

Figure 7:
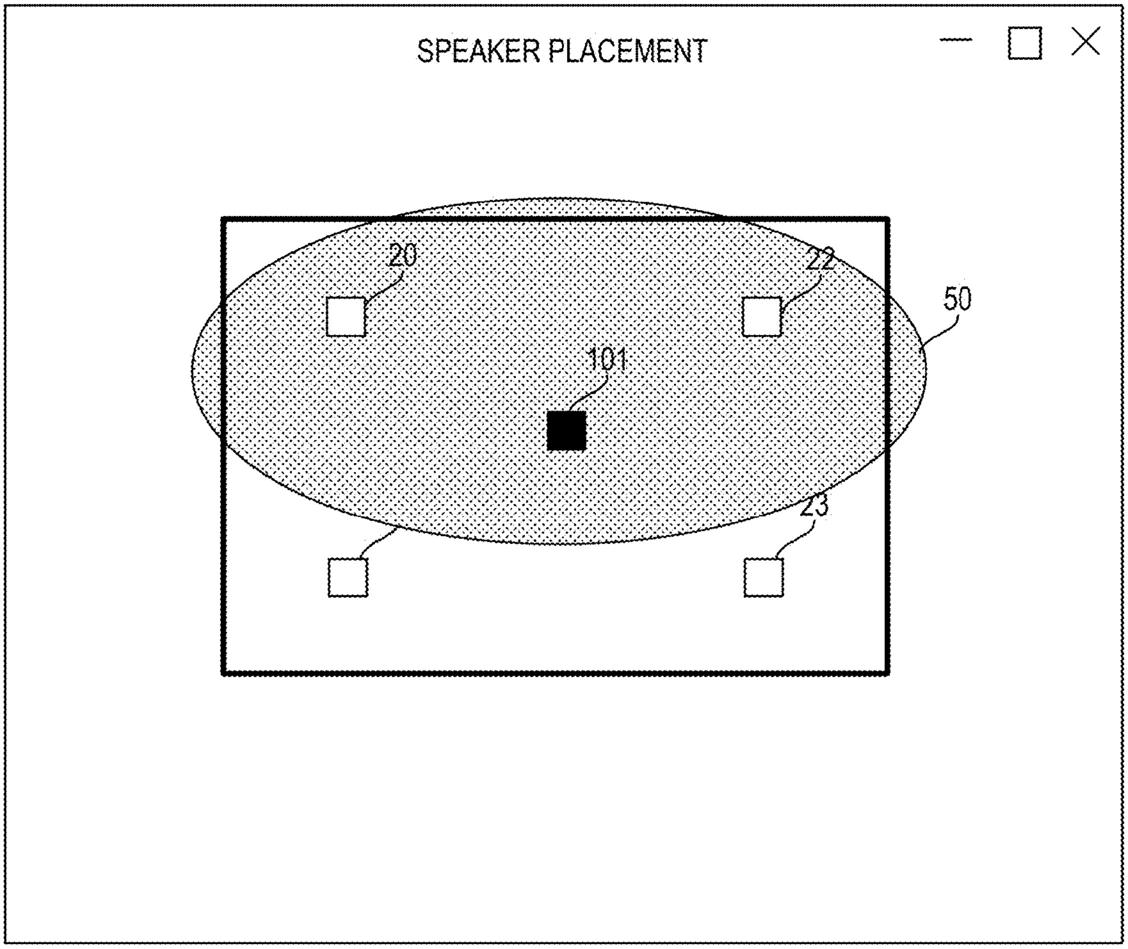
FIG. 7 is a diagram showing an example of a screen (GUI) of an application program for performing a sound processing method according to a fourth modification.

A sound processing apparatus 1 according to a fourth modification receives position information that produces an effect by reverb processing from a user, and selects a first speaker and a second speaker, based on the position information received from the user. FIG. 7 is a diagram showing an example of a screen (GUI) of an application program for performing a sound processing method according to the fourth modification. The processor 12 displays a speaker placement screen as shown in FIG. 7 on the display 15 and receives an operation to designate the position information from the user through the user I/F 16.

In the example of FIG. 7, the sound processing apparatus 1 receives an ellipse-shaped region 50 as the position information that produces an effect by reverb processing from a user. The region 50 of FIG. 7 includes the listening position 101 and covers a range greatly extending farther forward and sideways than the size of the room.

The distribution processor 123 sequentially outputs the effect signal to the speaker 20, the speaker 21, the speaker 22, and the speaker 23, based on the position of the designated region 50. For example, the distribution processor 123 increases weighting of the speaker 20 and the speaker 22, and preferentially selects the speaker 20 and the speaker 22.

As a result, the user can designate a position at which the reverb effect is desired to be gained and can gain a new customer experience of being able to feel an intended reverb effect.

Fifth Modification

Figure 8:
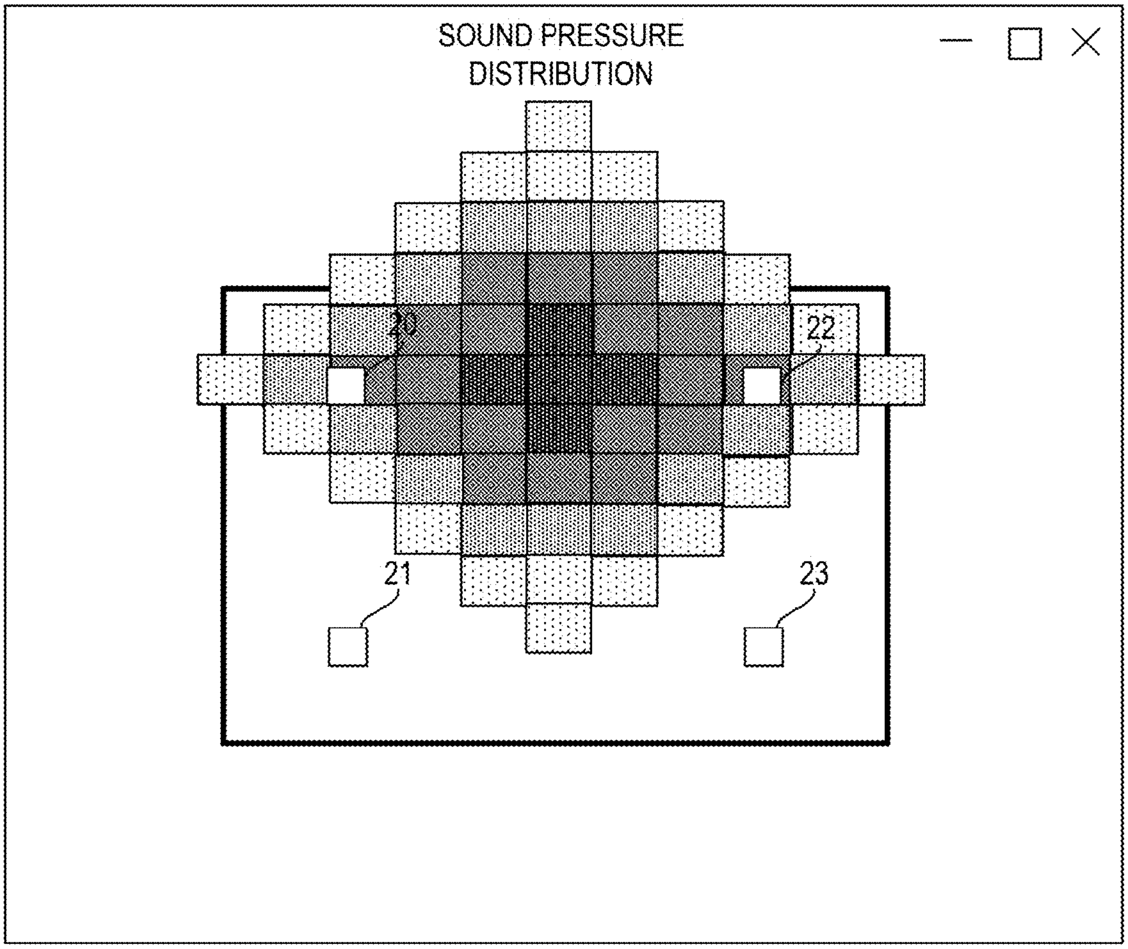
FIG. 8 is a diagram showing an example of a screen (GUI) of an application program for performing a sound processing method according to a fifth modification.

FIG. 8 is a diagram showing an example of a screen (GUI) of an application program for performing a sound processing method according to a fifth modification. The processor 12, based on the region 50 designated in the example of FIG. 7, calculates sound pressure distribution by the reverb effect and displays the sound pressure distribution on the display 15.

A sound travels from a sound source (a speaker) to a surrounding area in a spherical shape. Sound pressure (energy) is inversely proportional to the square of a distance from the sound source. In addition, the speed of sound transmitted in air, that is, sound velocity V is calculated at $V=331.5+0.61t$ (however, t is the temperature in degrees Celsius). On the other hand, the reverb processing is processing to add delay that is level-adjusted by adding a predetermined amount of delay to an input signal. Therefore, the processor 12 determines a time change of the sound pressure at each position in consideration of the delay and level adjustment amount in the reverb processing. Accordingly, the processor 12 is able to calculate the sound pressure distribution by the reverb effect.

As a result, the user can gain a new customer experience of being able to visually recognize the reverb effect.

Sixth Modification

Figure 9:
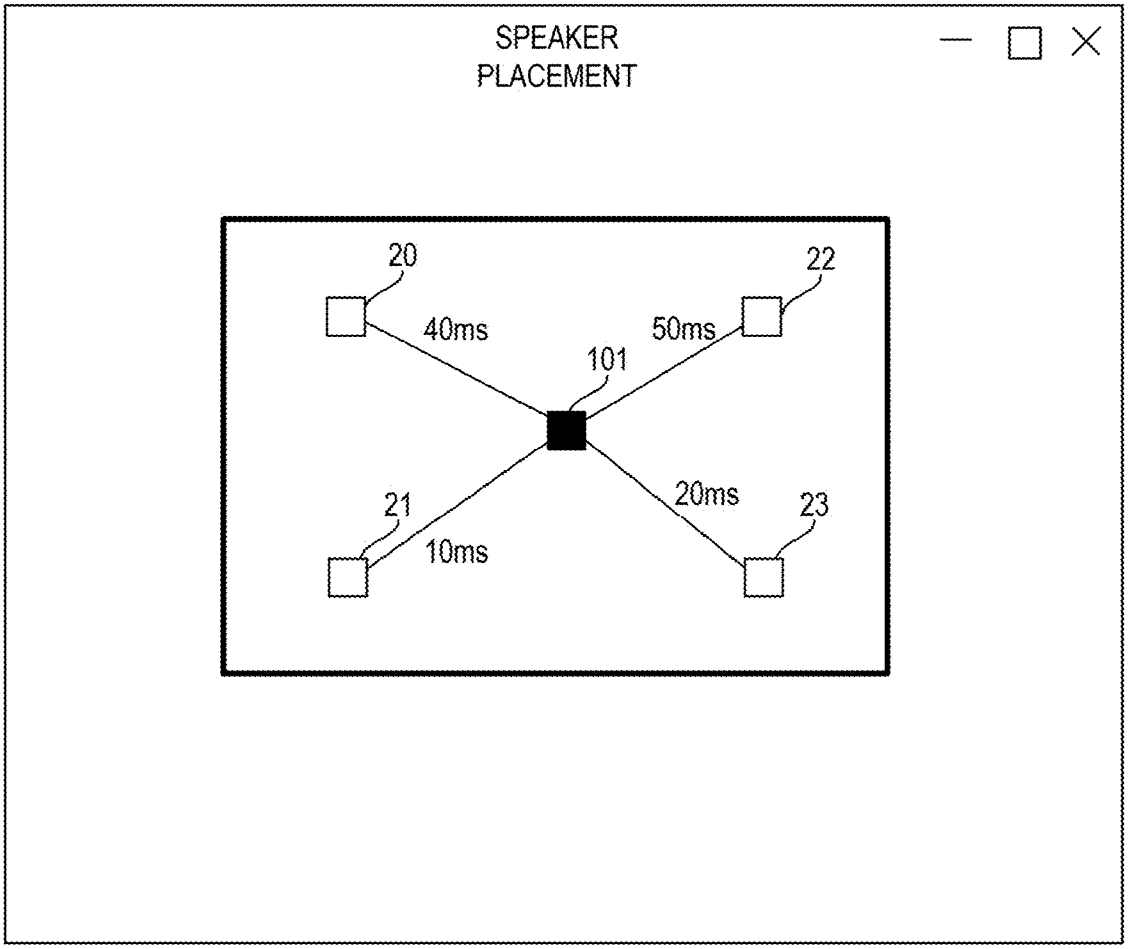
FIG. 9 is a diagram showing an example of a screen (GUI) of an application program for performing a sound processing method according to a sixth modification.

FIG. 9 is a diagram showing an example of a screen (GUI) of an application program for performing a sound processing method according to a sixth modification. The processor 12 displays a speaker placement screen as shown in FIG. 9 on the display 15 and receives an operation to designate position information from a user through the user I/F 16. In the example of FIG. 9, the sound processing apparatus 1 receives an amount of delay between the listening position 101 and each speaker as the position information that produces the effect by the reverb processing, from the user. In the region 50 of FIG. 9, a large delay amount is set to the speaker 20 and the speaker 22 that are placed in front, and a small delay amount is set to the speaker 21 and the speaker 23 that are placed in rear. Therefore, the reverb effect greatly extending farther forward and sideways than the size of the room, including the listening position 101, is designated.

In this case as well, the user can designate a position at which the reverb effect is desired to be gained and can gain a new customer experience of being able to feel an intended reverb effect.

Other Examples

The positional relationship of the speakers may include a three-dimensional positional relationship. The processor 12 may increase weighting on the speaker apart in a height direction and may preferentially select a speaker with a significant difference in height.

As a result, the user can gain a new customer experience of being able to feel the reverb effect extending in the height direction. For example, the user can feel the reverb effect as if being in a domed mosque even in a place of worship set in a room of a building.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A sound processing method comprising:

receiving an audio signal;

generating an effect signal obtained by performing reverb processing on the audio signal;

selecting a first speaker among three or more speakers, and selecting a second speaker corresponding to the first speaker based on a positional relationship with the first speaker, the second speaker being a speaker farthest from the first speaker among the three or more speakers; and distributing the effect signal to the selected first speaker and second speaker.

2. The sound processing method according to claim 1, comprising:

performing correlation reduction processing on the effect signal to be supplied to the first speaker and the second speaker.

3. The sound processing method according to claim 2, wherein the correlation reduction processing performs finite impulse response (FIR) filter processing of which phase characteristics are different, respectively, on a first effect signal to be supplied to the first speaker and a second effect signal to be supplied to the second speaker.

4. The sound processing method according to claim 1, wherein the positional relationship includes a three-dimensional positional relationship.

5. The sound processing method according to claim 1, wherein the positional relationship includes information on a distance.

6. The sound processing method according to claim 1, wherein at least one of the first speaker or the second speaker includes a virtual speaker virtually localized by acoustic image localization processing.

7. The sound processing method according to claim 1, comprising:

receiving position information that produces an effect by the reverb processing from a user; and selecting the first speaker and the second speaker, based on the position information received from the user.

8. A sound processing apparatus comprising:

a processor configured to:

receive an audio signal;

generate an effect signal obtained by performing reverb processing on the audio signal;

select a first speaker among three or more speakers, and select a second speaker corresponding to the first speaker based on a positional relationship with the first speaker, the second speaker being a speaker farthest from the first speaker among the three or more speakers; and distribute the effect signal to the selected first speaker and second speaker.

9. The sound processing apparatus according to claim 8, wherein the processor is configured to:

perform correlation reduction processing on the effect signal to be supplied to the first speaker and the second speaker.

10. The sound processing apparatus according to claim 9, wherein the correlation reduction processing includes performing finite impulse response (FIR) filter processing of which phase characteristics are different, respectively, on a first effect signal to be supplied to the first speaker and a second effect signal to be supplied to the second speaker.

11. The sound processing apparatus according to claim 8, wherein the positional relationship includes a three-dimensional positional relationship.

12. The sound processing apparatus according to claim 8, wherein the positional relationship includes information on a distance.

13. The sound processing apparatus according to claim 8, wherein at least one of the first speaker or the second speaker includes a virtual speaker virtually localized by acoustic image localization processing.

14. The sound processing apparatus according to claim 8, wherein the processor is configured to:

receive position information that produces an effect by the reverb processing from a user, and select the first speaker and the second speaker, based on the position information received from the user.

15. A non-transitory computer-readable storage medium storing a program that causes an information processing apparatus to execute processing comprising:

receiving an audio signal;

generating an effect signal obtained by performing reverb processing on the audio signal;

selecting a first speaker among three or more speakers, and selecting a second speaker corresponding to the first speaker based on a positional relationship with the first speaker, the second speaker being a speaker farthest from the first speaker among the three or more speakers; and distributing the effect signal to the selected first speaker and second speaker.

16. The non-transitory computer-readable storage medium according to claim 15, wherein the program stored thereon causes the information processing apparatus to execute the processing comprising:

performing correlation reduction processing on the effect signal to be supplied to the first speaker and the second speaker.

17. The non-transitory computer-readable storage medium according to claim 16, wherein the correlation reduction processing performs finite impulse response (FIR) filter processing of which phase characteristics are different, respectively, on a first effect signal to be supplied to the first speaker and a second effect signal to be supplied to the second speaker.

18. The non-transitory computer-readable storage medium according to claim 15, wherein the positional relationship includes at least one of a three-dimensional positional relationship or information on a distance.

19. The non-transitory computer-readable storage medium according to claim 15, wherein at least one of the first speaker or the second speaker includes a virtual speaker virtually localized by acoustic image localization processing.

20. The non-transitory computer-readable storage medium according to claim 15, wherein the program stored thereon causes the information processing apparatus to execute the processing comprising:

receiving position information that produces an effect by the reverb processing from a user; and selecting the first speaker and the second speaker, based on the position information received from the user.

* * * * *